US011434338B2

(12) United States Patent
Foussard et al.

(10) Patent No.: US 11,434,338 B2
(45) Date of Patent: *Sep. 6, 2022

(54) VINYL ESTER POWDER PRE-PREG

(71) Applicant: Polynt Composites France, Drocourt (FR)

(72) Inventors: Thierry Foussard, Hersin Coupigny (FR); Paul Darby, Scartho Grimsby (GB); Serge Herman, Noeux les Mines (FR); Christine Dhersin, Sailly Labourse (FR)

(73) Assignee: Polynt Composites France, Drocourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,812

(22) Filed: Jul. 29, 2020

(65) Prior Publication Data
US 2020/0354535 A1 Nov. 12, 2020

Related U.S. Application Data

(63) Continuation of application No. 15/531,345, filed as application No. PCT/IB2015/002401 on Nov. 30, 2015, now Pat. No. 10,752,743.

(30) Foreign Application Priority Data

Nov. 27, 2014 (EP) ..................................... 14290355

(51) Int. Cl.
*C08J 5/24* (2006.01)
*C08J 5/04* (2006.01)
*B29B 11/16* (2006.01)
*B29C 43/18* (2006.01)
*B29K 309/08* (2006.01)
*B29K 31/00* (2006.01)
*B29K 105/08* (2006.01)

(52) U.S. Cl.
CPC ................. *C08J 5/24* (2013.01); *B29B 11/16* (2013.01); *B29C 43/18* (2013.01); *C08J 5/043* (2013.01); *B29K 2031/00* (2013.01); *B29K 2105/0872* (2013.01); *B29K 2309/08* (2013.01); *C08J 2363/10* (2013.01)

(58) Field of Classification Search
CPC .......... C08J 5/24; C08J 5/043; C08J 2363/10; B29B 11/16; B29C 43/18; B29K 2031/00; B29K 2105/0872; B29K 2309/08
USPC ....................................................... 264/320
See application file for complete search history.

(56) References Cited

U.S. PATENT DOCUMENTS

| 4,992,228 | A | * | 2/1991 | Heck | B29B 15/105 |
| | | | | | 264/135 |
| 6,017,588 | A | | 1/2000 | Watanabe et al. | |
| 2006/0154039 | A1 | | 7/2006 | Suzuki et al. | |
| 2007/0049143 | A1 | * | 3/2007 | D'Silva | B29C 70/12 |
| | | | | | 442/59 |
| 2012/0077402 | A1 | * | 3/2012 | Grasser | B29B 15/10 |
| | | | | | 442/179 |
| 2012/0261060 | A1 | | 10/2012 | Jones et al. | |
| 2013/0203890 | A1 | | 8/2013 | Lopitaux et al. | |

FOREIGN PATENT DOCUMENTS

| JP | 2006232903 | 9/2006 |
| JP | 2009235175 | 10/2009 |
| JP | 2009235182 | 10/2009 |

OTHER PUBLICATIONS

"Thermal Properties," Polymer Chemistry, Ohmsha, Japan, Mar. 20, 2011, 4 pp.
Gibson, et al., "Impregnation technology for thermoplastic matrix composites," Composites Manufacturing, vol. 3, No. 4, Jan. 1, 1992.
International Search Report and Written Opinion for PCT/IB2015/002401 dated Apr. 19, 2016.
Li, "Chapter 1. Literature Review," Synthesis, Characterization and Properties of Vinyl Ester Matrix Resins, XP055187818, Jan. 21, 1998.
Office Action for Japanese Patent Application No. 2017-547083 dated Nov. 25, 2019, 12 pp.
Reinforced Plastics, "Technology update: prepregs," Elsevier Advanced Technology, New York, vol. 47, No. 6, Jun. 1, 2003.

* cited by examiner

*Primary Examiner* — David T Karst

(74) *Attorney, Agent, or Firm* — Neal, Gerber & Eisenberg LLP

(57) ABSTRACT

The invention provides a powder pre-preg comprising as sole resin a vinyl ester resin having a Tg in the range of −5 to +30° C. and a melt viscosity @100° C. in the range of 2 to 75 dPa·s, which can be used in making a composite at a temperature as low as 80° C.

17 Claims, No Drawings

VINYL ESTER POWDER PRE-PREG

CROSS-REFERENCE

This application is a continuation of U.S. patent application Ser. No. 15/531,345, filed on Nov. 30, 2015, the contents of which are incorporated herein by reference in their entirety.

FIELD OF THE INVENTION

The invention relates to reinforcement fibres coated with resin.

BACKGROUND

The volume sector of Structural Composites is dominated by Unsaturated Polyester Resins (UPR) reinforced with glass-fibre, and commonly known as GRP (Glass-fibre Reinforced Polyester). The reactive diluent for the resin is invariably styrene, which is becoming subject to more stringent regulatory measures, particularly lower occupational exposure limits in the workplace. This has led resin suppliers and processors to seek alternative solutions to styrene. A first approach has involved the use of alternative vinyl aromatic monomers such as vinyl toluene and divinyl benzene. However, the regulatory status of these substances is not drastically different than that of styrene. A second approach has been the use of methacrylate monomers typified by butanediol dimethacrylate, triethylene glycol dimethacrylate and hydroxypropyl methacrylate. Lower vapour pressures of these methacrylates means that emissions into the workplace atmosphere are much lower than those of styrene. However, this advantage is offset by the potential skin sensitising properties of these substances.

There are many different conversion processes for the production of Structural Composite parts. The method chosen depends on a variety of factors such as: number of parts to be produced, size of part, structural requirement and desired production rate. High production rates can be achieved with hot press moulding where the resin is first converted into a 'pre-preg': a resin pre-impregnated reinforcement. In the art, pre-preg is a term for "pre-impregnated" composite fibres. For hot press moulding these pre-pregs are typified by Dough Moulding Compound (DMC) and Sheet Moulding Compound (SMC).

WO9222603 (DSM) discloses a semi-finished product consisting of fibrous material and a virtually powdered thermosetting resin having a glass transition temperature above 35° C., a curing temperature at least 40° C. higher than the glass transition temperature, and a viscosity of less than 5000 Pa·s at a temperature between the glass transition temperature and the curing temperature, the resin particles being partly fused and partly in contact with the fibrous material. All examples rely on a single composition based on unsaturated polyester, however they require the use of at least one diluent, namely triallylcyanurate (a high-boiling copolymerisable monomer); curing was performed at 150° C.

Thus, there is a need for a monomer-free composition that can be cured at a temperature as low as 80° C.

The subject of the current invention is a novel pre-preg concept using a powder resin thereby drastically reducing volatile workplace emissions of substances of potential concern and potential skin sensitisation issues. Additionally the invention has significant processing and productivity benefits.

SUMMARY OF INVENTION

The basis of the invention is a solid thermosetting resin which is vinyl ester (a resin produced by the ring opening of an epoxy resin with an unsaturated monocarboxylic acid). Vinyl ester as used herein includes pure vinyl esters and blends of vinyl esters (differing by their molecular weight, chemical type of the epoxy and/or acid). Each vinyl ester must have the appropriate balance of Tg and melt viscosity. The resin is produced in conventional equipment by conventional processing. However, the resin is not let-down in styrene or any other diluent.

The solid resin is then mechanically ground or micronised in a carefully controlled process to produce a powder with a particle size and particle size distribution dependent on the intended application. Typically, the powder would have 80% by volume of particles between 20 and 100 um, and 99% between 0.5 and 100 um.

At this point the cure initiator and any desired additives may be incorporated by a blending process, preferably by dry blending. The size and distribution of the particles to be dry blended should be essentially the same. Additives include fillers, surface modifiers, pigments and possibly fire retardant or intumescent additives.

The powder is then used to impregnate the fibre reinforcement which may be in the form of loose fibres, or of a non-woven or woven material. The impregnation may be by way of a simple casting process, by spray or by an electrostatic process.

The powder resin must then be fixed in place by a short heating process such as placement in an oven or radiant exposure. The temperature and duration of the heating step are kept to a minimum to ensure that the particles adhere to the fibres without excessive cross-linking.

The pre-preg thus obtained can now be stored, transported or used by a processor to produce a structural component. There is a minimal amount of cross-linking unavoidable during the fixation step, which may have the advantage of increasing the Tg just enough to allow storage of the pre-preg at room temperature.

APPLICATIONS

The concept, namely the coating of reinforcement fibres with resin with its origin as a powder, was first thought of in terms of an alternative to liquid UPR used in open-mould processes such as hand-lay and spray-up. The obvious benefit is the elimination of styrene emissions in the workplace. The parts that can be produced can vary in size, shape and thickness. The sectors envisaged are marine, building and industrial.

Structural composite parts are often 'Gel Coated'. The Gel Coat is the component that provides the decorative and protective layer of the part. The Gel Coating process can be the source of high styrene emissions. The powder pre-preg concept can be used to replace the Gel Coat. In such cases a glass veil or tissue is impregnated with powder resin, initiator, pigment and optional fillers. The impregnated veil is placed in the heated mould to promote cure, and then the composite part can be built by either placement of powder pre-preg layers or conventional resins and reinforcements. It is thought that this concept is particularly suitable for the thin, flat composite structures used as insulation panels, for example, in refrigerated transport.

Many composite applications in the building and transport sectors require fire retardant properties. Conventionally this has been done by including halogen compounds in the resin formulation or by the addition of aluminium hydroxide filler. The first approach has the downside of high smoke emission in the event of a fire; additionally, many of these halogen compounds are coming under scrutiny with REACH (REACH is the Regulation on Registration, Evaluation, Authorisation and Restriction of Chemicals of the European Union). The issue with the second approach is that high levels of the filler make liquid resin difficult to process. We have however demonstrated that the powder pre-preg concept using a powder blend of resin with intumescent additives and fillers produces a highly effective intumescent composite. It is felt that this is particularly suited to rail rolling-stock applications.

The concept of Sheet Moulding Compound was introduced above. Current compounds use styrene-based liquid resins, although some products using a methacrylate diluent have been seen in the market-place. The powder pre-preg concept allows the elimination of styrene and any other diluents, higher fibre contents and hence greater structural strength.

Pre-pregs also exist with epoxy resin, generally for high structural requirements. Constraints in their use include high cost, short shelf-life and the need for relatively long cure cycles and high processing temperatures. The invention offers significant improvements on each of these parameters. It is envisaged that the products would be mostly suitable for industrial and leisure applications.

DESCRIPTION

The basis of the invention is a solid thermosetting resin which is vinyl ester. The resin is produced in conventional equipment by conventional processing. However, the resin is not let-down in styrene or any other diluent. The range and types of formulation are well known to one skilled in the art.

A vinyl ester is a resin produced by the ring opening of an epoxy resin with an unsaturated monocarboxylic acid. It is a thermosetting resin.

Typically the epoxy resin is based on bisphenol A (equivalent weight 180-500) and the monocarboxylic acid is methacrylic acid. Acrylic acid and derivatives can also be used. Novolac epoxy and blends of novolac and bisphenol A epoxies can also be used.

Typically the constituents are reacted in the ratio of 1 equivalent epoxy resin to 1 mole acid.

An example of vinyl ester is bisphenol A glycidyl methacrylate, obtained by reacting bisphenol A epoxy resin with methacrylic acid.

Essentially what is critical in the current application is balancing Tg with the melt viscosity. The Tg of the resin should be in the range of −5 to +30'C, preferably +5 to +25'C, most preferably +10 to +20° C. The melt viscosity @100'C should be in the range 2 to 75 dPa·s, preferably 10 to 25 dPa·s.

The resin must be converted to a powder. This can be done by mechanical grinders or air-driven microemisers such as jet mills, operating at a temperature lower than Tg. The preferred particle size range is achieved either by in-process classification or post-process treatments such as sieving. A broad range of average particle size (d50) would be 10-30 um. Typically, the powder would have 80% by volume of particles between 20 and 100 um, and 99% between 0.5 and 100 um.

The powder must be stored at a temperature lower than its Tg.

At this point additives are incorporated by a blending or coating process (still at a temperature lower than Tg) and will include the cure initiator (or initiators) and other desired additives such as fillers, surface modifiers, pigment and possibly fire retardant and intumescent additives. The cure initiators or catalysts are well known to one skilled in the art and are typically organic peroxides; the 1 hour half-life temperature is preferably below 100° C., more preferably below 85° C., most preferably below 70° C. The initiators may be combined with one or more accelerators or promoters, typically cobalt compounds and amine compounds; as a rule of thumb, these can reduce the curing temperature by 10 to 20° C. The fillers might serve to extend the resin composition, such as calcium carbonate, or to impart performance benefits, such as aluminium hydroxide (fire retardant properties). Surface modifiers could be exemplified by metal stearates; they are useful to preserve the integrity of the resin particles during storage.

The powder blend is then used to impregnate the fibre reinforcement which may be in the form of loose fibres, or of a non-woven or woven material. The fibres need to be compatible with the vinyl ester resin, and are therefore preferably glass fibre, more preferably selected from E-glass and S-glass. The impregnation may be by way of a simple casting process, by spray or preferably by an electrostatic process. The process chosen depends on the intended application. For instance, the electrostatic process is known to provide a particularly efficient and homogeneous distribution of the resin particles, and hence is well suited to high structural requirements. An example of such an efficient electrostatic process is provided in EP 1 998 953 B1.

The powder resin blend must then be fixed in place by a short heating process such as placement in an oven, radiant exposure or calendering. The objective of this is not to cure the resin composition, but to fix the resin particles to the fibres. The process would typically take place between 70-100° C., preferably 70-95° C., most preferably 70-90° C., typically during 3 to 7 minutes, preferably about 5 minutes.

The powder pre-preg can now be stored, transported, or used by a processor to produce a structural or semi-structural component in a process comprising placing the pre-preg according to the invention in a mould and heating the pre-preg, wherein the heating step consists of heating at a temperature in the range of 70-120° C., preferably 75-100° C., more preferably 80-90° C.

EXAMPLES

The glass transition temperature Tg is determined by the method according to ISO 11357-2:2013.

The melt viscosity is determined using a standard cone and plate viscometer.

The particle size distribution is determined by laser diffraction, based on Mie scattering theory. It is an established technique, covered by l'ISO13320 (2009).

Example 1A: Bisphenol A Vinyl Ester Synthesis 146 g Bisphenol A Epoxy (Equivalent weight 182-192) and 653 g Bisphenol A Epoxy (Equivalent weight 450-500) were charged to a 2 litre Quickfit flask equipped with stirrer, reflux, cooling, nitrogen and air sparges. To this 0.3 g toluhydroquinone and 3 g 2,4,6-tri(diméthylaminométhyl) phenol catalyst (Ancamine K54) were added. The mix was gently heated to 110° C. when 200 g methacrylic acid was charged at such a rate to maintain the temperature below 115° C. The mix was then held at 115° C. until an acid value below 8 mg KOH/g was achieved. The mix was poured into an Aluminium tray and allowed to cool and solidify.

Example 1B: Epoxy Novolac Vinyl Ester Synthesis 175 g Bisphenol A Epoxy (Equivalent weight 182-192) and 480 g Epoxy Novolac (Equivalent weight 170-180) were charged to a 2 litre Quickfit flask equipped with stirrer, reflux, cooling, nitrogen and air sparges. To this 0.2 g toluhydroquinone and 3.5 g 2,4,6-tri(diméthylaminomethyl) phenol catalyst (Ancamine K54) were added. The mix was gently heated to 100° C. when 330 g methacrylic acid was charged at such a rate to maintain the temperature below 110° C. The mix was then held at 115° C. until an acid value below 13 mg KOH/g was achieved. The mix was poured into an Aluminium tray to cool and was then transferred to a deep freezer.

Example 2A: Bisphenol A Vinyl Ester Powder

The solid in Example 1A was mechanically kibbled to granules 2-5 mm in diameter. The following operations were conducted in a laboratory climate controlled to 15° C. The granules were converted to a powder in a Waring blender. The temperature was further reduced by the introduction of dry ice into the blender chamber. The resultant powder was sieved to produce 1,000 g of mix<100 um. To this was added 20 g calcium stearate in a low shear blend process.

Characteristics: Tg=17° C., Melt viscosity @80° C.>100 dPa·s, Melt viscosity @100° C.=49 dPa·s, Particle size distribution:

| d10 | d50 | d90 | d100 |
| --- | --- | --- | --- |
| 3 um | 14 um | 42 um | 96 um |

To the powder were then added 10 g Fumed Silica and 15 g Perkadox 16 initiator (di(4-tert-butylcyclohexyl)peroxydicarbonate, 1 hour half-life temperature 64° C.) in the low shear blend process. The powder was stored below the Tg.

Example 3A: Bisphenol A Vinyl Ester Powder

Example 2A was repeated, replacing Perkadox 16 by Perkadox L DFG (dibenzoyl peroxide, 1 hour half-life temperature 91° C.). The powder was stored below the Tg.

Example 2B: Epoxy Novolac Vinyl Ester Powder

Example 2A was repeated with the solid of Example 1B and in a laboratory cabinet controlled to −15° C.

Characteristics (prior to addition of initiator): Tg=−4° C., Melt viscosity @80° C. 6 dPa·s, Melt viscosity @100'C 2 dPa·s. Particle size distribution: not determined (Tg is too low).

Example 4A: Powder Pre-Preg

A glass reinforcement mat comprising biaxial (45/45°) of weight 800 g/m2 and chopped strand mat of 200 g/m2 was cut into sections 15×15 cm. A section was placed in the chamber of a D-Preg electrostatic impregnator as described in EP 1 998 953 B1. An amount (30 g) of the powder described in Example 3A and taken directly from the deep freezer, was applied to the mat then subjected to impregnation as described in EP 1 998 953 B1. The powder was fixed in place by placement in an oven at 90'C for 5 minutes, to produce 15×15 cm pre-preg plies.

Example 4B: Powder Pre-Preg

A glass reinforcement combination mat comprising a biaxial (45/45°) woven layer of 800 g/m2 and a chopped strand layer of 200 g/m2 was cut into sections 15×15 cm. A section was placed in the chamber of a D-Preg electrostatic impregnator as described in EP 1 998 953 B1. An amount (30 g) of the powder described in Example 2B, and taken directly from the deep freezer, was applied to the mat then subjected to impregnation as described in EP 1 998 953 B1. The powder was fixed in place by placement in an oven at 70° C. for 5 minutes, to produce 15×15 cm pre-preg plies.

Example 5A: Powder Pre-Preg Mouldings

Two plies of the pre-preg produced in Example 4A were placed on top of each other, in the same orientation, in a metal mould and a one bar pressure was applied at 120° C. The part was demoulded after 10 minutes and was found to have a flexural strength of 215 MPa, and a modulus of 10.2 GPa.

Example 5B: Powder Pre-Preg Mouldings

Two plies of the pre-preg produced in Example 4B were placed on top of each other, in the same orientation, in a metal mould and a one bar pressure was applied at 80° C. The part was demoulded after 10 minutes.

Example 6: Intumescent Vinyl Ester Powder

The following powders were blended:
100 g of the powder produced in 3A
100 g ammonium polyphosphate (FR cros 484 ex-Budenheim)
50 g melamine (Melafine ex-OCI)
50 g pentaerythritol (Charmor PM40 ex-Perstorp)
Particle size distribution: d50=25 um, d90=100 um Example 7: Intumescent Pre-Preg A glass reinforcement combination mat comprising a biaxial (45/45°) woven layer of 800 g/m2 and a chopped strand layer of 200 g/m2 was cut into sections 15×15 cm. A section was placed in the chamber of a D-Preg electrostatic impregnator as described in EP 1 998 953 B1. An amount (90 g) of the powder described in Example 6 and taken directly from the deep freezer, was applied to the mat then subjected to impregnation as described in EP 1 998 953 B1. The powder was fixed in place by placement in an oven at 90° C. for 5 minutes, to produce 15×15 cm pre-preg plies.

Example 8: Intumescent Mouldings

Two plies of the pre-preg produced in Example 7 were placed on top of each other, in the same orientation, in a metal die and a 100 bar (10 MPa) pressure was applied at 120° C. The part was demoulded after 14 minutes. In a simulation of the Epiradiateur test (NFP 92-501), the panels showed a pronounced intumescent effect.

None of the above examples contain styrene or any other co-polymerisable monomers in the powder or its derivatives. This contrasts with WO9222603 where in each example triallyl cyanurate is present. This monomer is classified as harmful and dangerous to the environment.

The processing temperature for the mouldings produced in the above examples are in the range 80-120° C. This contrasts with 150° C. for the examples given in WO9222603. The ability to use a lower processing temperature represents a significant benefit for processors.

The invention claimed is:

1. Powder pre-preg comprising as sole resin a vinyl ester resin, where the resin has a Tg in the range of −5 to +30° C. and a melt viscosity @100° C. in the range of 2 to 75 dPa·s.

2. Powder pre-preg according to claim 1, wherein the vinyl ester resin has a Tg in the range of +5 to +25° C.

3. Powder pre-preg according to claim 1, wherein the vinyl ester resin has a melt viscosity @100° C. in the range of 10 to 25 dPa·s.

4. Powder pre-preg according to claim 1, comprising one or more cure initiators.

5. Powder pre-preg according to claim 1, comprising one or more additives selected from the group of fillers, surface modifiers, pigment, fire retardants, intumescent additives, and mixtures thereof.

6. Powder pre-preg according to claim 1, comprising fibres selected from the group consisting of loose fibres, non-woven fabrics and woven fabrics.

7. Process for preparing a powder pre-preg according to claim 1, comprising a fixing step which consists of heating at a temperature in the range of 70-100° C. during 3 to 7 minutes.

8. Process for preparing a powder pre-preg according to claim 7, wherein the powder has 80% by volume of particles between 20 and 100 um, and 99% by volume between 0.5 and 100 um.

9. Process for preparing a powder pre-preg according to claim 7, wherein the temperature range is 70-95° C.

10. Process for preparing a powder pre-preg according to claim 7, wherein the temperature range is 70-90° C.

11. Process for preparing a composite from a powder pre-preg according to claim 1, comprising placing the pre-preg in a mould and heating the pre-preg, wherein the heating step consists of heating at a temperature in the range of 70-120° C.

12. Process for preparing a powder pre-preg according to claim 11, wherein the heating is at a temperature in the range of 75-100° C.

13. Process for preparing a powder pre-preg according to claim 11, wherein the heating is at a temperature in the range of 80-90° C.

14. Powder pre-preg according to claim 1, wherein the vinyl ester resin has a Tg in the range of +10 to +20° C.

15. Powder pre-preg according to claim 1, comprising one or more cure initiators having a 1 hour half-life temperature below 85° C.

16. Powder pre-preg according to claim 1, comprising one or more cure initiators having a 1 hour half-life temperature below 70° C.

17. Powder pre-preg according to claim 1, comprising one or more cure initiators selected from organic peroxides.

* * * * *